(12) United States Patent
Takahashi et al.

(10) Patent No.: US 9,068,814 B2
(45) Date of Patent: Jun. 30, 2015

(54) POLISHING MONITORING METHOD, POLISHING APPARATUS AND MONITORING APPARATUS

(75) Inventors: Taro Takahashi, Tokyo (JP); Yoichi Kobayashi, Tokyo (JP); Shinrou Ohta, Tokyo (JP); Akihiko Ogawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 644 days.

(21) Appl. No.: 12/285,674

(22) Filed: Oct. 10, 2008

(65) Prior Publication Data
US 2009/0096446 A1  Apr. 16, 2009

(30) Foreign Application Priority Data

Oct. 11, 2007  (JP) .................................. 2007-265307

(51) Int. Cl.
*G01B 7/06* (2006.01)
(52) U.S. Cl.
CPC ...................................... *G01B 7/105* (2013.01)
(58) Field of Classification Search
CPC ........................................................ G01B 7/105
USPC ............................................................. 324/230
See application file for complete search history.

(56) References Cited

U.S. PATENT DOCUMENTS 6,563,308 B2 * 5/2003 Nagano et al. ................ 324/230
2007/0103150 A1 5/2007 Tada et al.

FOREIGN PATENT DOCUMENTS

| CN | 1871494 | 11/2006 |
| JP | 04-032761 | 2/1992 |
| JP | 2005-121616 | 5/2005 |

OTHER PUBLICATIONS

Chirlian, Paul, Basic Network Theory, McGraw Hill, 1969, p. 275-283, 350-355.*
Niknejad, Ali et al., Analysis of eddy-current losses over conductive substrates with applications to monolithic inductors and transformers, IEEE Trans. on Microwave Theory and Techniques, V. 49, No. 1, 2001, p. 166-176.*
Wincheski, Buzz, New eddy current probe for thickness gauging of conductive materials, NASA Langley Research Center, posted by Penn State University, www.citeseerx.ist.psu.edu/viewdoc/download?doi=10.1.1.75.7441 . . . , p. 1-8.*

* cited by examiner

Primary Examiner — Thomas F Valone
(74) Attorney, Agent, or Firm — Wenderoth, Lind & Ponack, L.L.P.

(57) ABSTRACT

A method monitors a change in thickness of a conductive film brought into sliding contact with a polishing surface of a polishing pad using an eddy current sensor. The output signal of the eddy current sensor includes two signals corresponding to a resistance component and an inductive reactance component of an impedance of an electric circuit including a coil of the eddy current sensor. The method includes acquiring the output signal of the eddy current sensor when the eddy current sensor is facing the conductive film, defining the two signals as coordinates on a coordinate system, repeating the acquiring of the output signal and the defining of the coordinates, determining a center of curvature of an arc specified by at least three sets of coordinates on the coordinate system, determining an angle of inclination of a line connecting the center of curvature and a latest one of the at least three sets of coordinates, and monitoring a change in thickness of the conductive film by monitoring a change in the angle of inclination.

4 Claims, 23 Drawing Sheets

The lines do not converge on a point, because the center of curvature changes in its position each time the new data point is obtained.

POLISHING MONITORING METHOD, POLISHING APPARATUS AND MONITORING APPARATUS

BACKGROUND OF THE INVENTION

1. Field of the Invention

The present invention relates to a method of monitoring a change in thickness of a conductive film formed on a surface of a substrate during polishing and also relates to a polishing apparatus and a monitoring apparatus.

2. Description of the Related Art

A polishing apparatus is widely used for polishing a conductive film, such as a barrier film and an interconnect metal film, formed on a surface of a wafer. Polishing end point detection and a change in polishing conditions during polishing are determined based on a thickness of the conductive film. Thus, the polishing apparatus usually includes a film-thickness detector for detecting a thickness of the conductive film during polishing. A typical example of this film-thickness detector is an eddy current sensor. This eddy current sensor is configured to supply a high-frequency alternating current to a coil so as to induce an eddy current in the conductive film to thereby detect the thickness of the conductive film from a change in impedance caused by a magnetic field of the eddy current induced.

FIG. 1 is a view showing an equivalent circuit for explaining a principle of the eddy current sensor. When an AC power supply 3 sends a high-frequency alternating current $I_1$ to a coil 1, magnetic lines of force, induced in the coil 1, pass through the conductive film. As a result, mutual inductance occurs between a sensor-side circuit and a conductive-film-side circuit, and an eddy current $I_2$ flows through the conductive film. This eddy current $I_2$ creates magnetic lines of force, which cause a change in an impedance of the sensor-side circuit. The eddy current sensor measures the thickness of the conductive film from the change in the impedance of the sensor-side circuit.

In the sensor-side circuit and the conductive film-side circuit in FIG. 1, the following equations hold.

$$R_1 I_1 + L_1 dI_1/dt + M dI_2/dt = E \quad (1)$$

$$R_2 I_2 + L_2 dI_2/dt + M dI_1/dt = 0 \quad (2)$$

where M represents mutual inductance, $R_1$ represents equivalent resistance of the sensor-side circuit including the coil 1, $L_1$ represents self inductance of the sensor-side circuit including the coil 1, $R_2$ represents equivalent resistance of the conductive film in which the eddy current is induced, and $L_2$ represents self inductance of the conductive film through which the eddy current flows.

Letting $I_n = A_n e^{e\omega t}$ (sine wave), the above equations (1) and (2) are expressed as follows.

$$(R_1 + j\omega L_1)I_1 + j\omega M I_2 = E \quad (3)$$

$$(R_2 + j\omega L_2)I_2 + j\omega M I_1 = O \quad (4)$$

From these equations (3) and (4), the following equations are derived.

$$I_1 = E(R_2 + j\omega L_2)/[(R_1 + j\omega L_1)(R_2 + j\omega L_2) + \omega^2 M^2] \quad (5)$$
$$= E/[(R_1 + j\omega L_1) + \omega^2 M^2/(R_2 + j\omega L_2)]$$

Thus, the impedance Φ of the sensor-side circuit is given by the following equation.

$$\Phi = E/I_1 = [R_1 + \omega^2 M^2 R_2/(R_2^2 + \omega^2 L_2^2)] + j\omega[L_1 - \omega^2 L_2 M^2/(R_2^2 + \omega^2 L_2^2)] \quad (6)$$

Substituting X and Y respectively for a real part (i.e., a resistance component) and an imaginary part (i.e., an inductive reactance component) of the impedance Φ, the following equation is given.

$$(X-R_1)^2 + [Y-\omega L_1(1-k^2/2)]^2 = (\omega L_1 k^2/2)^2 \quad (7)$$

A symbol k in the equation (7) represents coupling coefficient, and the following relationship holds.

$$M = k(L_1 L_2)^{1/2} \quad (8)$$

FIG. 2 is a view showing a graph drawn by plotting X and Y, which change with a polishing time, on a XY coordinate system. The coordinate system shown in FIG. 2 is defined by a vertical axis as a Y-axis and a horizontal axis X-axis. Coordinates of a point T∞ are values of X and Y when a thickness of a film is zero, i.e., $R_2$ is zero. Where electrical conductivity of a substrate can be neglected, coordinates of a point T0 are values of X and Y when the thickness of the film is infinity, i.e., $R_2$ is infinity. A point Tn, specified by the values of X and Y, travels in an arc toward the point T0 as the thickness of the film decreases.

FIG. 3 shows a graph obtained by rotating the graph in FIG. 2 through 90 degrees in a counterclockwise direction and further translating the resulting graph. Specifically, the point specified by the coordinates (X, Y) is rotated about the origin O in the XY coordinate system, and the rotated coordinates are further moved so as to create a graph in which a distance between the origin O and the point specified by the coordinates (X, Y) decreases in accordance with a decrease in thickness of the film. A further process, such as amplification, may be applied to the graph in FIG. 3. Although FIG. 3 shows the case where the graph in FIG. 2 is rotated through 90 degrees in the counterclockwise direction, the rotation angle is not limited to 90 degrees. For example, the rotation angle can be adjusted such that the Y-coordinate corresponding to an upper limit of the film thickness to be monitored is equal to the Y-coordinate of the point where the film thickness is zero.

As shown in FIG. 3, the point Tn, positioned from the values of X and Y, travels in an arc toward the point T0, as the thickness of the film decreases. During traveling, an impedance $Z(=(X^2+Y^2)^{1/2})$ decreases as the thickness of the film decreases, as long as the point Tn is not positioned near the point T∞. Therefore, by monitoring the impedance Z, a change in thickness of the film during polishing and a polishing end point can be determined. FIG. 4 shows a graph created by plotting the impedance Z on the vertical axis and a polishing time on the horizontal axis. As shown in this graph, the impedance Z decreases with the polishing time, and becomes constant at a certain time point. Thus, by detecting such a singular point of the impedance Z, the polishing end point can be determined.

Recently, a so-called low-resistance substrate having a very low resistivity (specific resistance) of a substrate itself has been introduced. This low-resistance substrate has a resistivity which is about one thousandth of that of a normal substrate. The substrate having a low resistance provides advantages including realization of low-voltage drive (i.e., larger current can flow using the same voltage) and low on-resistance (i.e., wider applications that require a large current can be achieved).

However, the low-resistance substrate has a sheet resistance that is close to a sheet resistance of a conductive film as an object of polishing. This results in a great influence on the output signal of the eddy current sensor. This problem will be described with reference to FIG. 5. FIG. 5 is a graph showing a locus of the output signal of the eddy current sensor when polishing a tungsten film having a thickness of 100 nm on a substrate (normal substrate) having a normal resistivity, and also showing a locus of the output signal of the eddy current sensor when polishing a tungsten film having the same thickness on a low-resistance substrate. The sheet resistance of the normal substrate is much larger than a sheet resistance of the tungsten film. In this case, it is possible to substantially ignore an effect of the substrate on the output signal of the eddy current sensor. Therefore, the output signal of the eddy current sensor is hardly affected by the sheet resistance of the substrate, and the output signal as in FIG. 5 can be obtained, as long as the film thickness is the same.

On the other hand, the sheet resistance of the low-resistance substrate does not greatly differ from the sheet resistance of the tungsten film. In this case, the output signal of the eddy current sensor is likely to be affected by the low-resistance substrate. As a result, as shown in FIG. 5, the locus of the output signal of the eddy current sensor moves greatly to a large-thickness side as compared with the case of using the normal substrate. In addition, due to a slight difference in resistivity between low-resistance substrates, the locus of the output signal of the eddy current sensor could change as shown in FIG. 5, even when the tungsten film of the same thickness is polished.

Even in this case where the locus of the output signal of the eddy current sensor moves, it is possible to detect the polishing end point since the singular point is drifted as well, as shown in FIG. 6. However, this movement of the output signal leads to problems when stopping polishing or when changing the polishing conditions at a time point when a preset target thickness is reached. This is because of a change in relationship between the values of the output signal of the eddy current sensor and the film thickness. This causes an error in detection of the polishing time.

In addition, there is a difference in degree of a change in the impedance Z indicating the change in film thickness between the normal substrate and the low-resistance substrate. Specifically, as shown in FIGS. 7 and 8, in the normal substrate, an impedance Z1 greatly changes as the film thickness changes. On the other hand, in the low-resistance substrate, an impedance Z2 does not greatly change as the film thickness changes. Such a small change in the impedance Z causes deterioration of a signal-to-noise ratio. As a result, accuracy in detecting the polishing end point and the changing point of the polishing conditions would be lowered.

Moreover, the eddy current sensor has a characteristic such that the output signal thereof changes in accordance with the distance from the conductive film as a target. Consequently, as the distance between the eddy current sensor and the substrate changes due to wear of a polishing pad or the like, the output signal of the eddy current sensor changes as well, in spite of the same film thickness.

SUMMARY OF THE INVENTION

The present invention has been made in view of the above drawbacks. It is therefore an object of the present invention to provide a polishing monitoring method, a polishing apparatus, and a monitoring apparatus capable of accurately monitoring a change in film thickness even when polishing a conductive film on a low-resistance substrate and even when a polishing pad is worn.

One aspect of the present invention for achieving the above object is to provide a monitoring method for monitoring a change in thickness of a conductive film brought into sliding contact with a polishing surface of a polishing pad using an eddy current sensor. The method includes acquiring an output signal of the eddy current sensor when the eddy current sensor is facing the conductive film, the output signal comprising two signals corresponding to a resistance component and an inductive reactance component of an impedance of an electric circuit including a coil of the eddy current sensor, defining the two signals as a data point on a coordinate system, repeating the acquiring of the output signal and the defining of the coordinates, determining a center of curvature of an arc specified by at least three data points on the coordinate system, determining an angle of inclination of a line connecting the center of curvature and a latest (i.e., newest) one of the at least three data points, and monitoring a change in thickness of the conductive film by monitoring a change in the angle of inclination.

The principle of the present invention will be described below. When a resistivity of a low-resistance substrate varies from substrate to substrate as described above, the locus of the output signal of the eddy current sensor also changes from substrate to substrate, as shown in FIGS. 9 and 10. FIG. 9 shows an example in which a starting angle (or starting point) of the locus of the output signal is greatly different from that in the other locus. In this case, the difference in the starting angle may be small and the two loci may be overlapped. FIG. 10 shows an example in which a radius of the locus is different from another, in addition to the difference in starting angle. Further, the locus of the output signal of the eddy current sensor may change as a result of a change in distance between the substrate and the eddy current sensor due to wear of the polishing pad, as shown in FIG. 11. In FIGS. 9 through 11, a symbol SP represents a polishing starting point, and a symbol EP represents a polishing end point. The inventors have discovered that each of the arc-shaped loci has a substantially equal central angle when the film thickness is the same, even if the arc-shaped locus of the output signal of the eddy current sensor changes, as shown in FIGS. 9 through 11. In other words, when the film thickness is the same, a decreasing rate of the film thickness is substantially equal to an increasing rate of the central angle. Therefore, the change in film thickness can be monitored from the change in the central angle of the arc-shaped locus.

In the present invention, the output signal of the eddy current sensor that changes in accordance with the film thickness is plotted as the coordinates on the coordinate system, so that a change in the angle of inclination of the line connecting a point plotted and the center of curvature (i.e., a change in central angle) is monitored. Therefore, accurate monitoring of the film thickness can be achieved without being affected by variation in resistivity of low-resistance substrates and a change in distance between a substrate and the eddy current sensor.

In a preferred aspect of the present invention, the conductive film is formed on a low-resistance substrate.

In a preferred aspect of the present invention, the method further includes creating from the angle of inclination a monitoring signal that is to decrease in accordance with an increase in the angle of inclination. The monitoring a change in thickness of the conductive film comprises monitoring a change in thickness of the conductive film based on a change in the monitoring signal.

Another aspect of the present invention is to provide a polishing apparatus including a rotatable polishing table to support a polishing pad having a polishing surface, an eddy current sensor provided in the polishing table, a top ring configured to press a substrate against the polishing surface, a mechanism configured to provide relative motion between the substrate and the polishing pad, and a monitoring unit configured to monitor a change in thickness of a conductive film brought into sliding contact with the polishing surface using the eddy current sensor. The monitoring unit is operable to acquire an output signal of the eddy current sensor when the eddy current sensor is facing the conductive film, the output signal comprising two signals corresponding to a resistance component and an inductive reactance component of an impedance of an electric circuit including a coil of the eddy current sensor, define the two signals as a data point on a coordinate system, repeat acquiring of the output signal and defining of the data points, determine a center of curvature of an arc specified by at least three data points on the coordinate system, determine an angle of inclination of a line connecting the center of curvature and a latest one of the at least three data points, and monitor a change in thickness of the conductive film by monitoring a change in the angle of inclination.

Another aspect of the present invention is to provide a monitoring apparatus for monitoring a change in thickness of a conductive film brought into sliding contact with a polishing surface of a polishing pad using an eddy current sensor. The monitoring apparatus includes structure configured to acquire an output signal of the eddy current sensor when the eddy current sensor is facing the conductive film, the output signal comprising two signals corresponding to a resistance component and an inductive reactance component of an impedance of an electric circuit including a coil of the eddy current sensor, define the two signals as a data point on a coordinate system, repeat acquiring of the output signal and defining of the data point, determine a center of curvature of an arc specified by at least three data points on the coordinate system, determine an angle of inclination of a line connecting the center of curvature and a latest one of the at least three data points, and monitor a change in thickness of the conductive film by monitoring a change in the angle of inclination.

The present invention as described above can provide accurate monitoring of the film thickness regardless of a variation in resistivity of the low-resistance substrate and a change in distance between the substrate and the eddy current sensor.

DETAILED DESCRIPTION OF THE PREFERRED EMBODIMENTS

Embodiments of the present invention will be described below with reference to the drawings.

Figure 12:
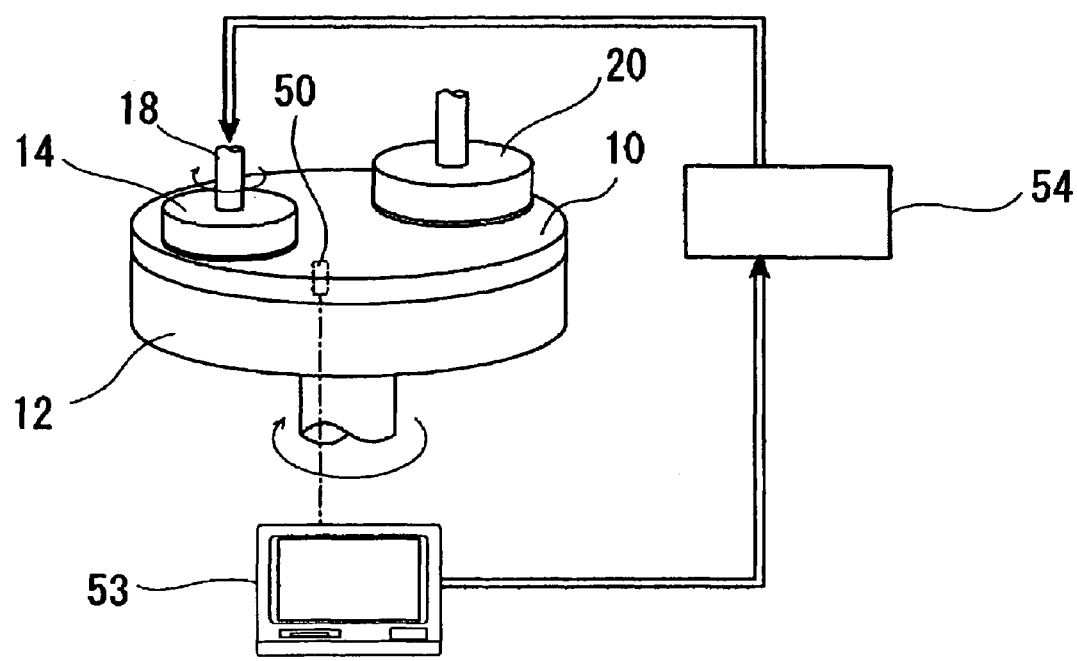
FIG. 12 is a schematic view showing a whole structure of a polishing apparatus according to an embodiment of the present invention.

FIG. 12 is a schematic view showing a whole structure of a polishing apparatus according to an embodiment of the present invention. As shown in FIG. 12, the polishing apparatus has a polishing table 12 supporting (or holding) a polishing pad 10 on an upper surface thereof, a top ring 14 configured to hold a wafer (substrate), which is a workpiece to be polished, and to press the wafer against an upper surface of the polishing pad 10, and a dresser 20 configured to perform dressing (or conditioning) on the upper surface of the polishing pad 10 when polishing of the wafer is not performed. The upper surface of the polishing pad 10 provides a polishing surface used in sliding contact with the wafer.

The polishing table 12 is coupled to a motor (not shown) disposed therebelow, and is rotatable about its own axis as indicated by arrow. A polishing liquid supply nozzle (not shown) is disposed above the polishing table 12, so that a polishing liquid is supplied from the polishing liquid supply nozzle onto the polishing pad 10.

The top ring 14 is coupled to a top ring shaft 18, which is coupled to a motor and an elevating cylinder (not shown). The top ring 14 can thus be vertically moved as indicated by arrow and rotated about the top ring shaft 18. The wafer to be polished is attracted to and held on a lower surface of the top ring 14 by a vacuum attraction or the like.

With the above-described structures, the wafer, held on the lower surface of the top ring 14, is rotated and pressed by the top ring 14 against the polishing surface of the polishing pad 10 on the rotating polishing table 12. The polishing liquid is supplied from the polishing liquid supply nozzle onto the polishing surface of the polishing pad 10. The wafer is thus polished in the presence of the polishing liquid between the surface (lower surface) of the wafer and the polishing pad 10. In this embodiment, the polishing table 12 and the top ring 14 constitute a mechanism of providing relative motion between the wafer and the polishing pad 10.

Figure 13:
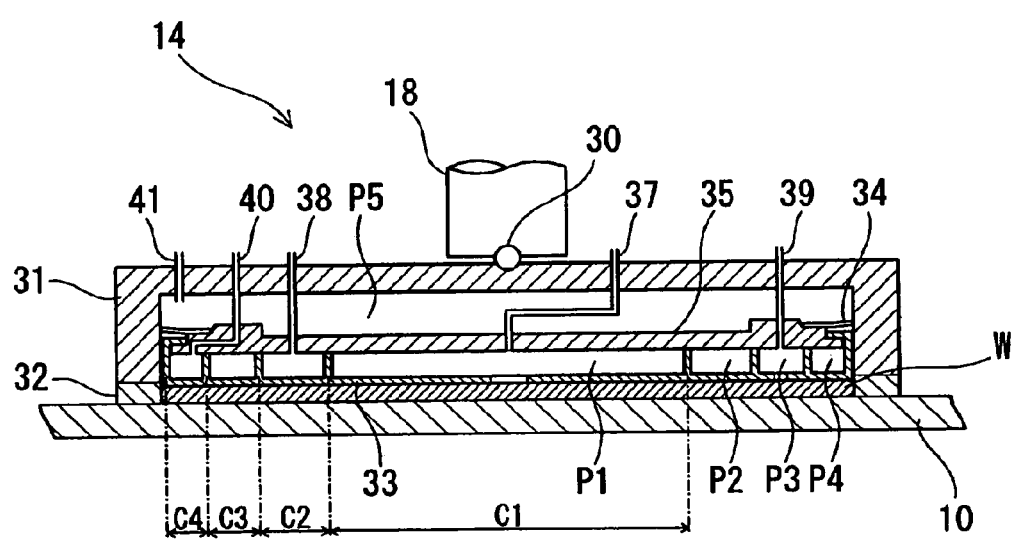
FIG. 13 is a schematic view showing a cross section of a top ring shown in FIG. 12.

FIG. 13 is a schematic view showing a cross section of the top ring shown in FIG. 12. As shown in FIG. 13, the top ring 14 has a disk-like top ring body 31 coupled to a lower end of the top ring shaft 18 via a flexible joint 30, and a retainer ring 32 provided on a lower portion of the top ring body 31. The top ring body 31 is made of a material having high strength and rigidity, such as metal or ceramic. The retainer ring 32 is made of highly rigid resin, ceramic, or the like. The retainer ring 32 may be formed integrally with the top ring body 31.

The top ring body 31 and the retainer ring 32 have therein a space, which accommodates an elastic pad 33 to be brought into contact with the wafer W, an annular pressure sheet 34 made from an elastic membrane, and a disk-shaped chucking plate 35 configured to hold the elastic pad 33. The elastic pad 33 has an upper peripheral edge held by the chucking plate 35. Four pressure chambers (air bags) P1, P2, P3, and P4 are provided between the elastic pad 33 and the chucking plate 35. These pressure chambers P1, P2, P3, and P4 are in fluid communication with a non-illustrated pressure-adjusting device via fluid passages 37, 38, 39, and 40, respectively. The pressure-adjusting device is configured to supply a pressurized fluid (e.g., a pressurized air) into the pressure chambers P1, P2, P3, and P4 and to develop a vacuum in these pressure chambers. The center pressure chamber P1 has a circular shape, and the other pressure chambers P2, P3, and P4 have an annular shape. These pressure chambers P1, P2, P3, and P4 are concentrically arranged. The pressure-adjusting device may comprise a compressor and a vacuum pump.

The pressure-adjusting device can independently change internal pressures of the pressure chambers P1, P2, P3, and P4 to thereby substantially independently adjust pressing forces to be applied to four areas: a central area C1, an inner area C2, an outer area C3, and a peripheral area C4. To be exact, each area is more or less affected by the adjacent area. Further, by elevating or lowering the top ring 14 in its entirety, the retainer ring 32 can exert a predetermined force on the polishing pad 10. A pressure chamber P5 is formed between the chucking plate 35 and the top ring body 31. The above-described pressure-adjusting device is configured to supply a pressurized fluid into the pressure chamber P5 and to develop a vacuum in the pressure chamber P5 via a fluid passage 41. With this operation, the chucking plate 35 and the elastic pad 33 in their entirety are moved vertically. The retainer ring 32 is arranged around the wafer W so as to prevent the wafer W from coming off the top ring 14 during polishing.

Figure 2:
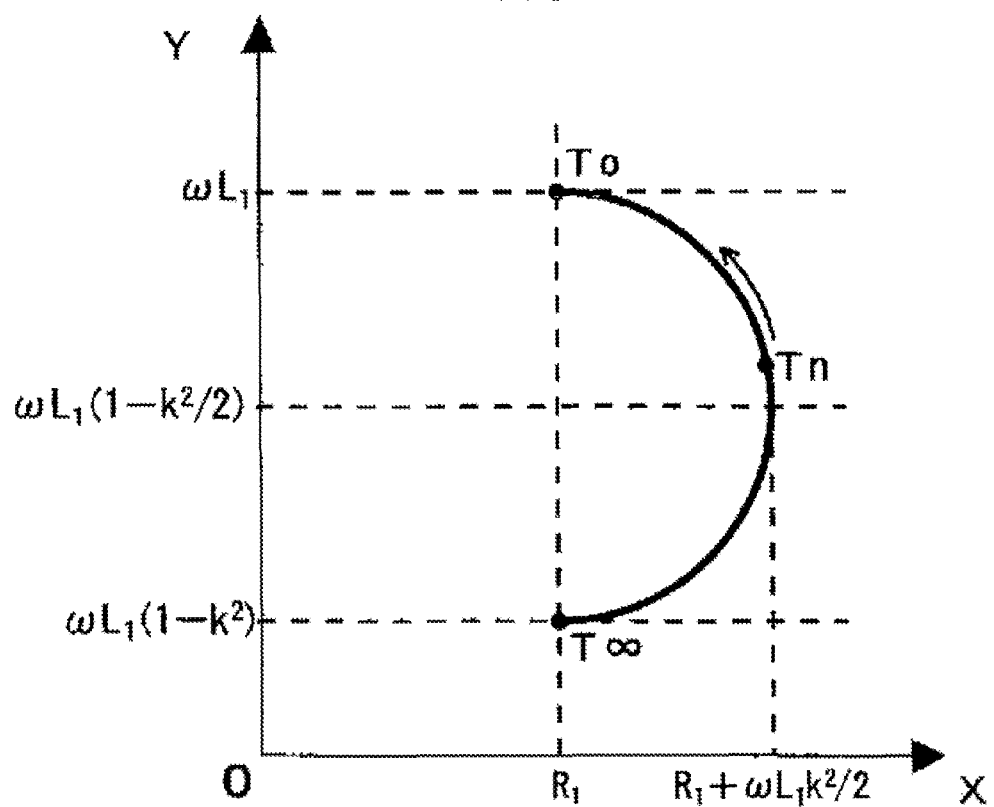
FIG. 2 is a view showing a graph drawn by plotting X and Y, which change with a polishing time, on a XY coordinate system.

As shown in FIG. 12, an eddy current sensor 50 for detecting a thickness of a conductive film formed on the wafer W is provided in the polishing table 12. This eddy current sensor 50 is coupled to a monitoring unit 53, which is coupled to a CMP controller 54. Output signals of the eddy current sensor 50 are sent to the monitoring unit 53. This monitoring unit 53 processes the output signals of the eddy current sensor 50, as described with reference to FIGS. 3 and 4, and calculates the impedance Z (see FIG. 4) as a monitoring signal that changes in accordance with the thickness of the conductive film. Processing of the output signals of the eddy current sensor 50 by the monitoring unit 53 include the rotating process and the translating process of the graph shown in FIG. 2. The monitoring unit 53 monitors a change in the monitoring signal (i.e., a change in thickness of the conductive film) during polishing in each of the areas C1, C2, C3, and C4.

Figure 14:
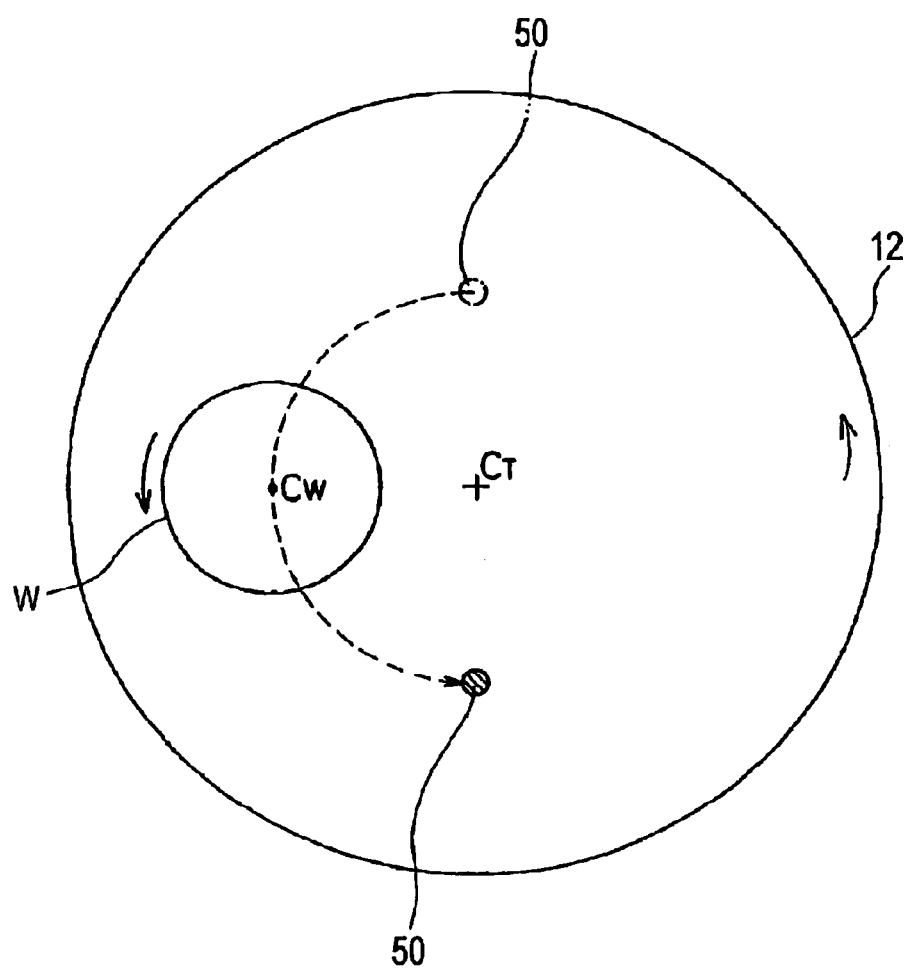
FIG. 14 is a plan view showing a positional relationship between a polishing table and a wafer.

FIG. 14 is a plan view showing a positional relationship between the polishing table 12 and the wafer W. A symbol CT represents a rotation center of the polishing table 12. As shown in FIG. 14, the eddy current sensor 50 is provided in a position such that the eddy current sensor 50 passes through a center $C_w$ of the wafer W held by the top ring 14 during polishing. Specifically, the eddy current sensor 50 sweeps across the wafer W in a substantially radial direction of the wafer W each time the polishing table 12 makes one revolution.

Figure 15:
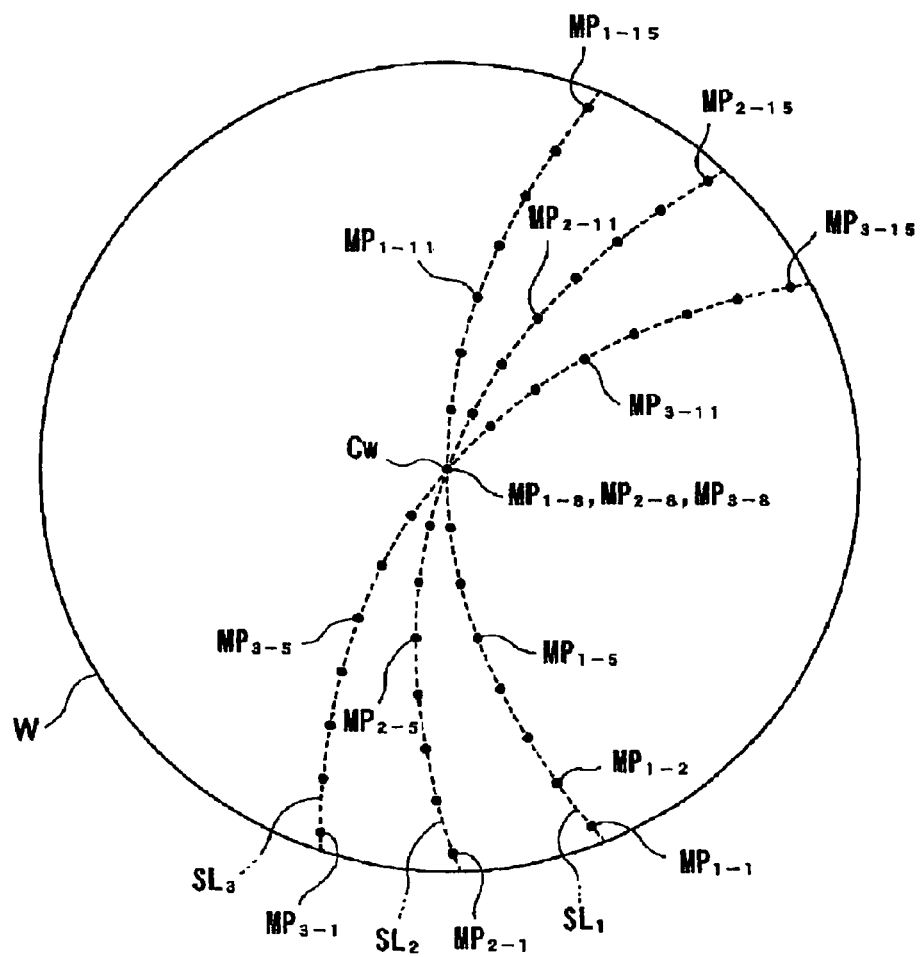
FIG. 15 is a view showing paths of an eddy current sensor sweeping across the wafer.

FIG. 15 is a view showing paths of the eddy current sensor 50 sweeping across the wafer W. As described above, when the polishing table 12 is rotated, the eddy current sensor 50 sweeps across a surface of the wafer W so as to describe a path passing through the center $C_w$ of the wafer W (i.e., the center of the top ring shaft 18). Because a rotational speed of the top ring 14 is generally different from a rotational speed of the polishing table 12, the path of the eddy current sensor 50 on the surface of the wafer W varies every time the polishing table 12 makes rotation, as shown by scan lines (sweep lines) $SL_1$, $SL_2$, $SL_3$, ... in FIG. 15. Even in this case, since the eddy current sensor 50 is located so as to pass through the center $C_w$ of the wafer W as described above, the path of the eddy current sensor 50 passes through the center $C_w$ of the wafer W in every rotation. In this embodiment, timing of film-thickness detection by the eddy current sensor 50 is adjusted so that the film thickness at the center $C_w$ of the wafer W is monitored by the eddy current sensor 50 in every rotation.

It is known that a film-thickness profile of a surface of a polished wafer W is generally axisymmetric with respect to an axis that extends through the center $C_w$ of the wafer W in a direction perpendicular to the surface of wafer W. Accordingly, as shown in FIG. 15, when an nth monitoring point on an mth scan line $SL_m$ is represented by $MP_{m-n}$, the change in the film thickness of the wafer W in a radial position of nth monitoring points can be monitored by tracking the monitoring signals of the nth monitoring points $MP_{1-n}$, $MP_{2-n}$, ..., $MP_{m-n}$, on respective scan lines.

Figure 16:
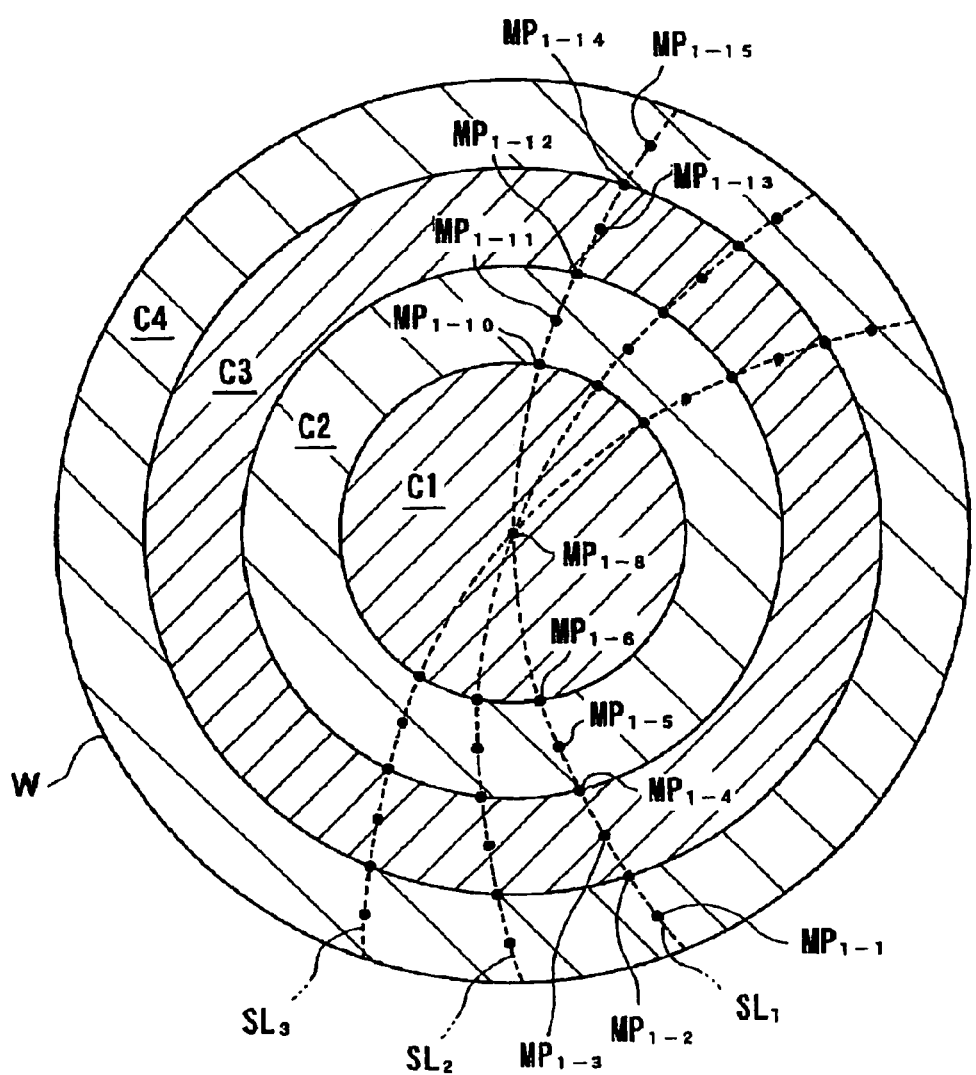
FIG. 16 is a plan view showing an example of selection of monitoring points to be monitored by a monitoring unit, among monitoring points on the wafer shown in FIG. 15.

FIG. 16 is a plan view showing an example of selection of the monitoring points to be monitored by the monitoring unit 53, among the monitoring points on the wafer shown in FIG. 15. In the example shown in FIG. 16, the monitoring unit 53 monitors the monitoring points $MP_{m-1}$, $MP_{m-2}$, $MP_{m-3}$, $MP_{m-4}$, $MP_{m-5}$, $MP_{m-6}$, $MP_{m-8}$, $MP_{m-10}$, $MP_{m-11}$, $MP_{m-12}$, $MP_{m-13}$, $MP_{m-14}$, and $MP_{m-15}$ located near centers and boundaries of the areas C1, C2, C3, and C4. Unlike the example shown in FIG. 15, another monitoring point may be provided between the monitoring points $MP_{m-i}$ and $MP_{m-(i+1)}$. Selection of the monitoring points to be monitored is not limited to the example shown in FIG. 16. Points to be monitored in view of controlling polishing of the surface of the wafer W can be selected as the monitoring points. Alternatively, all of the monitoring points on each scan line can be selected.

In FIG. 15, for the sake of simplification, the number of monitoring points in one scanning operation is 15. However, the number of monitoring points is not limited to the illustrated example and can be various numbers in accordance with a period of measurement and the rotational speed of the polishing table 12. For example, it is possible to set three hundreds of the monitoring points distributed from an end of the wafer W to another, and to divide these monitoring points into four segments corresponding to the areas C1, C2, C3, and C4. In this case, an average value or a representative value of the output signal values of the sensor 50 obtained at the monitoring points in each segment may be calculated, and the average value or the representative value calculated may be used as the output signal value of the sensor 50 in that segment. In order to smooth data to eliminate noises, the output signal values obtained at the neighboring monitoring points may be standardized.

The monitoring unit 53 compares the monitoring signal obtained at each selected monitoring point with a reference signal that is preset for each of the pressure chambers P1, P2, P3, and P4, and calculates optimum pressures in the pressure chambers P1, P2, P3, and P4 that can allow the respective monitoring signals to converge to the corresponding reference signal. Thus, the monitoring unit 53 functions as a controller for controlling the internal pressures of the pressure chambers P1, P2, P3, and P4 based on the monitoring signal.

The calculated pressures are sent from the monitoring unit 53 to the CMP controller 54. This CMP controller 54 changes the internal pressures of the pressure chambers P1, P2, P3, and P4 via the pressure-adjusting device. In this manner, the pressing forces applied to the respective areas C1, C2, C3, and C4 in the wafer W are adjusted. The monitoring unit 53 and the CMP controller 54 may be integrated into a single control unit.

Figure 1:
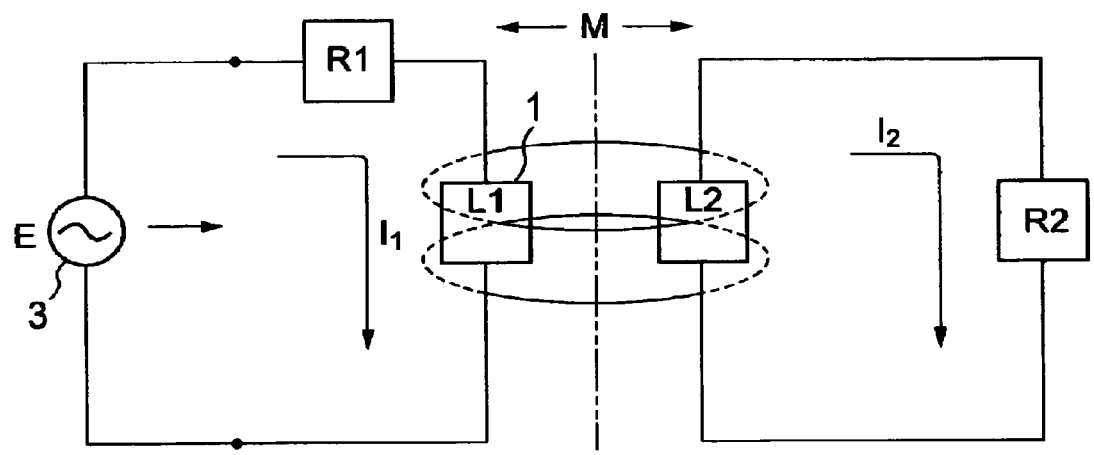
FIG. 1 is a view showing an equivalent circuit for explaining a principle of an eddy current sensor.
Figure 17:
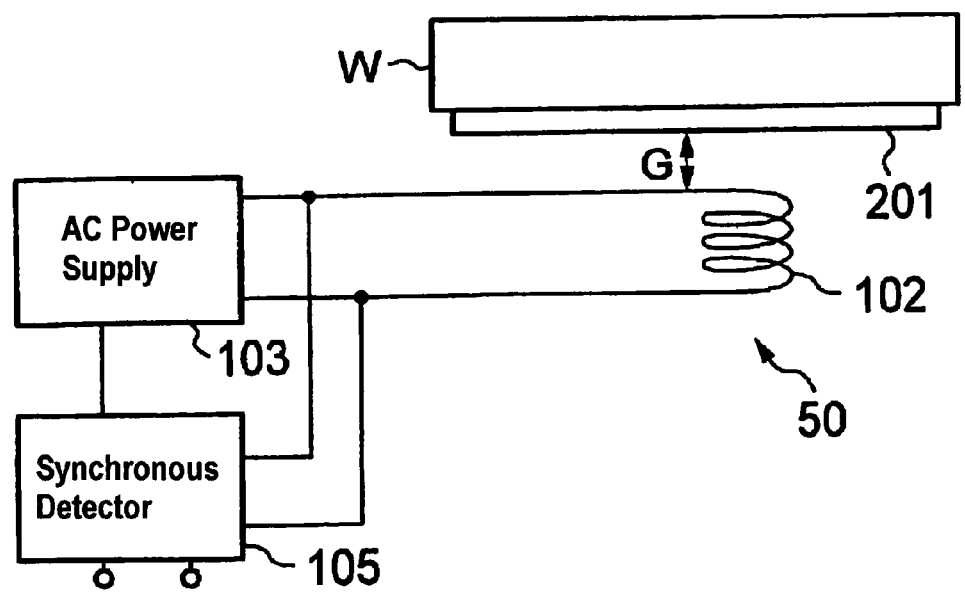
FIG. 17 is a schematic view showing the eddy current sensor.

FIG. 17 is a schematic view showing the eddy current sensor. This eddy current sensor 50 includes a sensor coil 102, an AC power supply 103 connected to the coil 102, and a synchronous detector 105 configured to detect a resistance component X and an inductive reactance component Y of an electric circuit including the sensor coil 102 (the sensor-side circuit in FIG. 1). A conductive film 201, which is a film to be detected in its thickness, is a thin film on the wafer W, and this thin film is made of a conductive material, such as copper, tungsten, tantalum, or titanium. A distance G between the sensor coil 102 and the conductive film is in a range of 0.5 mm to 5 mm, for example.

Figure 18:
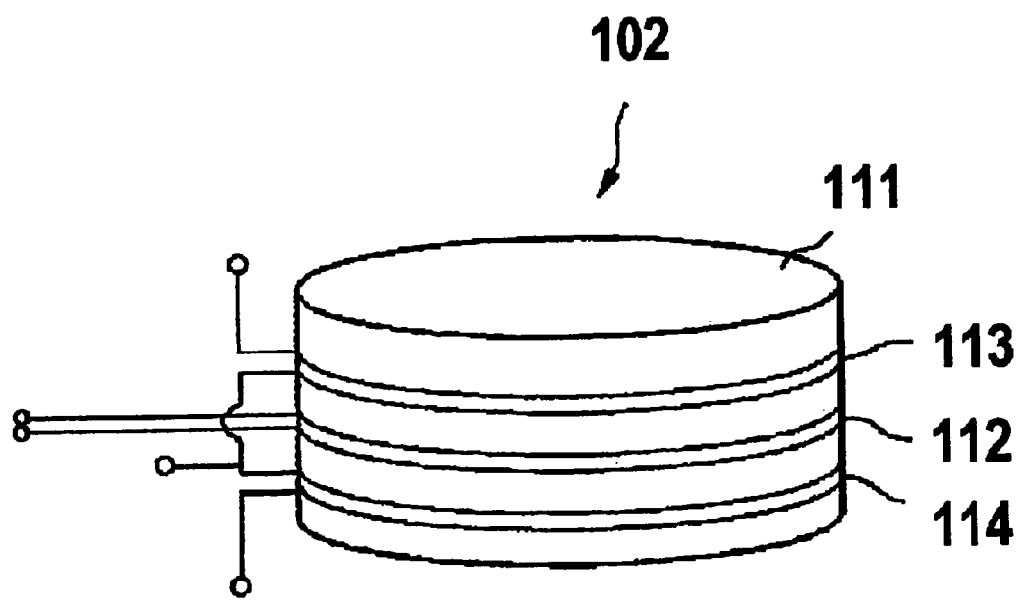
FIG. 18 is a view showing an example of a sensor coil of the eddy current sensor shown in FIG. 17.

FIG. 18 is a view showing an example arrangement of the sensor coil of the eddy current sensor shown in FIG. 17. The sensor coil 102 includes a bobbin 111, and three coils 112, 113, and 114 wound on the bobbin 111. These coils 112, 113, and 114 form a three-layer coil. The center coil 112 is an exciting coil connected to the AC power supply 103. This exciting coil 112 produces a magnetic field with supply of an alternating current from the AC power supply 103 to thereby generate an eddy current in the conductive film on the wafer. The detection coil 113 is located above the exciting coil 112 (i.e., located at the conductive-film side). This detection coil 113 is configured to detect a magnetic flux generated by the eddy current flowing in the conductive film. The balance coil 114 is located at an opposite side of the detection coil 113.

The coils 112, 113, and 114 have the same number of turns (1 to 500 turns). The detection coil 113 and the balance coil 114 are connected in opposite phase to each other. When the conductive film is present near the detection coil 113, the magnetic flux produced by the eddy current flowing through the conductive film is interlinked with the detection coil 113 and the balance coil 114. Since the detection coil 113 is located closer to the conductive film than the other coils, induced voltages produced in the coils 113 and 114 are unbalanced, whereby the interlinkage flux generated by the eddy current in the conductive film can be detected.

Figure 19:
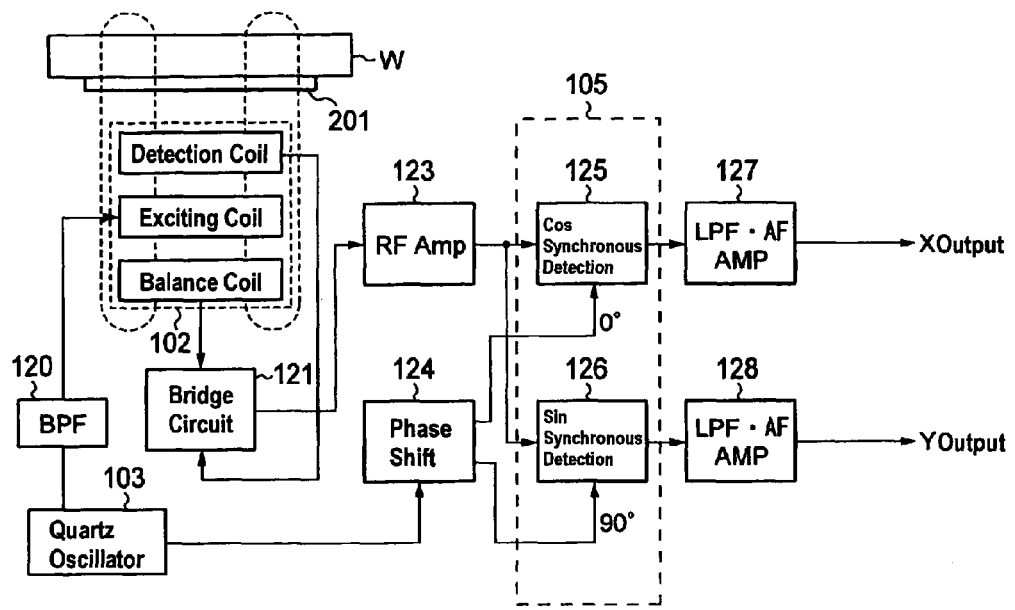
FIG. 19 is a schematic view showing the details of the eddy current sensor.

FIG. 19 is a schematic view showing the details of the eddy current sensor. The AC power supply 103 includes an oscillator, such as a quartz oscillator, generating a fixed frequency. For example, the AC power supply 103 supplies an alternating current having a fixed frequency of 1 to 50 MHz to the sensor coil 102. The alternating current generated by the AC power supply 103 is supplied to the sensor coil 102 via a bandpass filter 120. A terminal of the sensor coil 102 outputs a signal, which is sent to the synchronous detector 105 via a bridge circuit 121 and a high-frequency amplifier 123. The synchronous detector 105 has a cosine synchronous detection circuit 125 and a sine synchronous detection circuit 126, and extracts the resistance component and the inductive reactance component of an impedance.

Low-pass filters 127 and 128 are provided so as to remove unnecessary high-frequency components (e.g., not less than 5 kHz) from the resistance component and the inductive reactance component outputted from the synchronous detector 105. As a result, a signal X as the resistance component and a signal Y as the inductive reactance component of the impedance are outputted from the eddy current sensor 50. The monitoring unit 53 performs the same processes on the output signals X and Y as described with reference to FIG. 3 (e.g., the rotating process and the translating process), and plots the processed signals on a XY coordinate system. Processing of the output signals X and Y of the eddy current sensor 50, e.g., the rotating process and the translating process, may be performed electrically in the eddy current sensor 50 or may be performed by the calculation in the monitoring unit 53.

Figure 3:
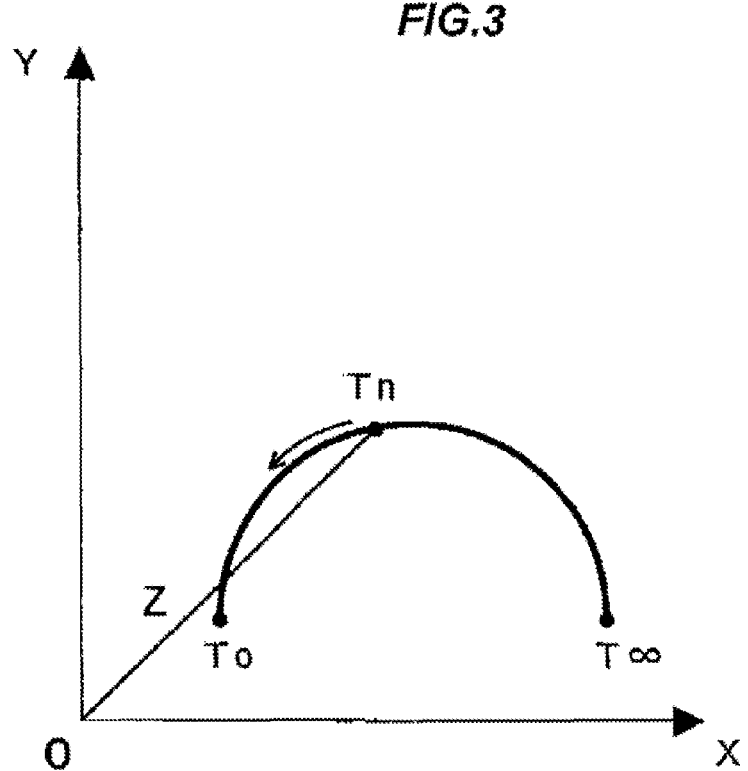
FIG. 3 shows a graph obtained by rotating the graph in FIG. 2 through 90 degrees in a counterclockwise direction and further translating the resulting graph.
Figure 4:
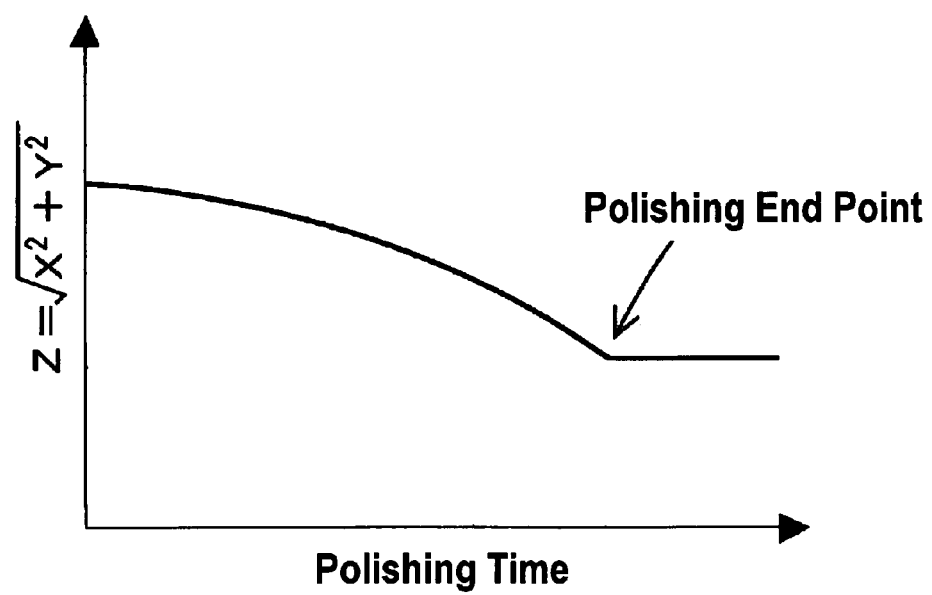
FIG. 4 shows a graph created by plotting an impedance Z on a vertical axis and a polishing time on a horizontal axis.
Figure 5:
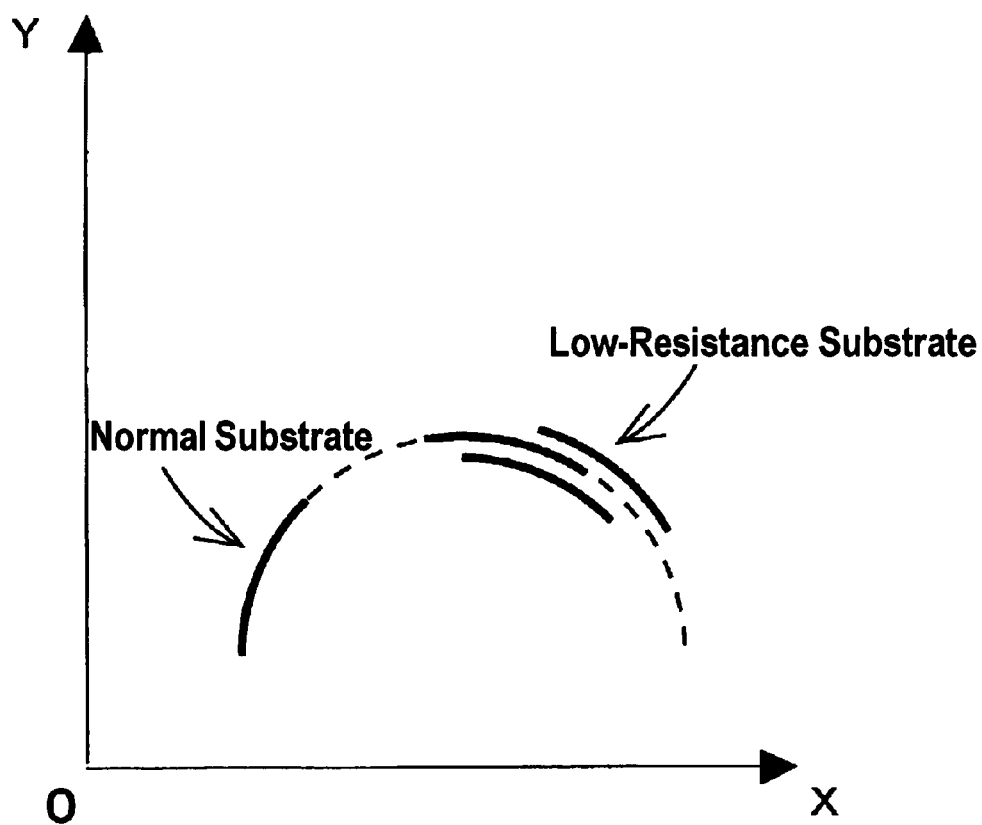
FIG. 5 is a graph showing a locus of an output signal of the eddy current sensor when polishing a tungsten film having a thickness of 100 nm on a normal substrate having a normal resistivity, and a locus of the output signal of the eddy current sensor when polishing a tungsten film having the same thickness on a low-resistance substrate.
Figure 6:
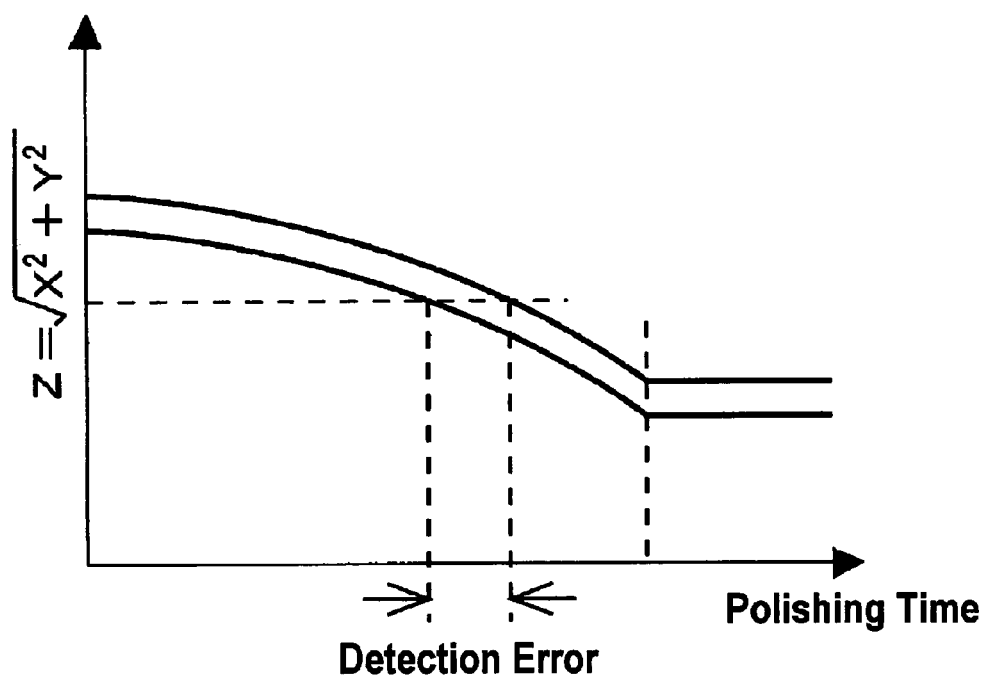
FIG. 6 is a view illustrating a detection error caused by a variation in resistivity between substrates.
Figure 7:
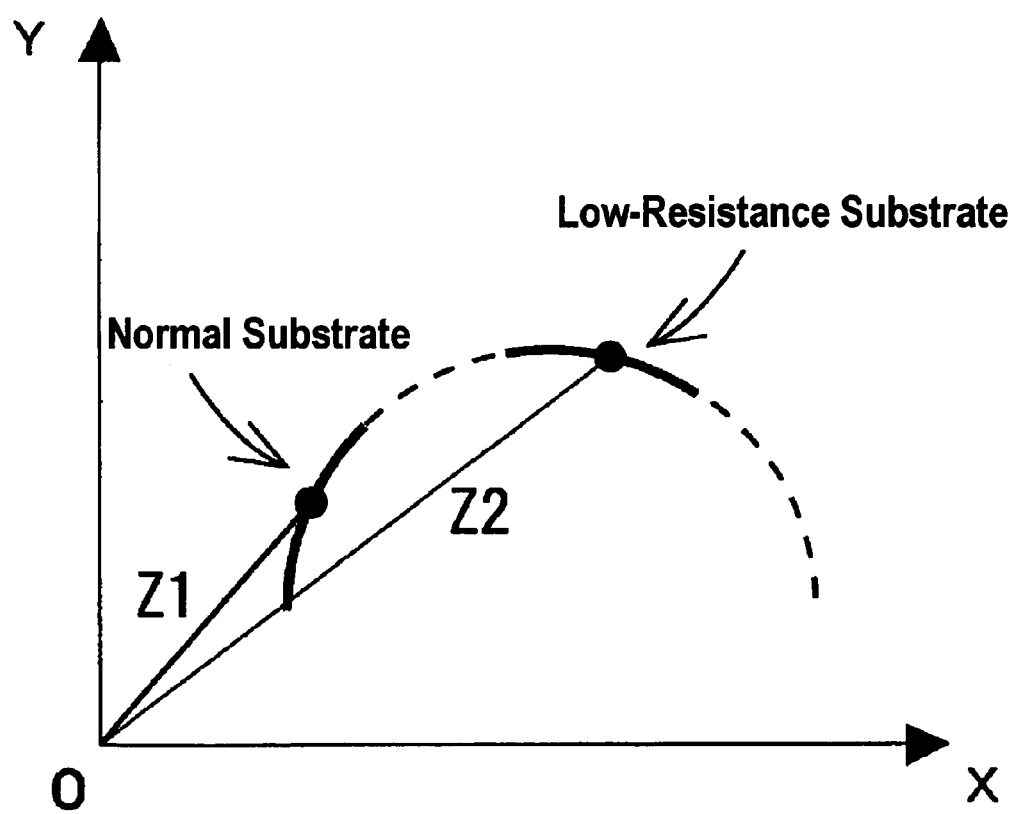
FIG. 7 is a graph showing a relationship between a film thickness and the impedance Z.
Figure 8:
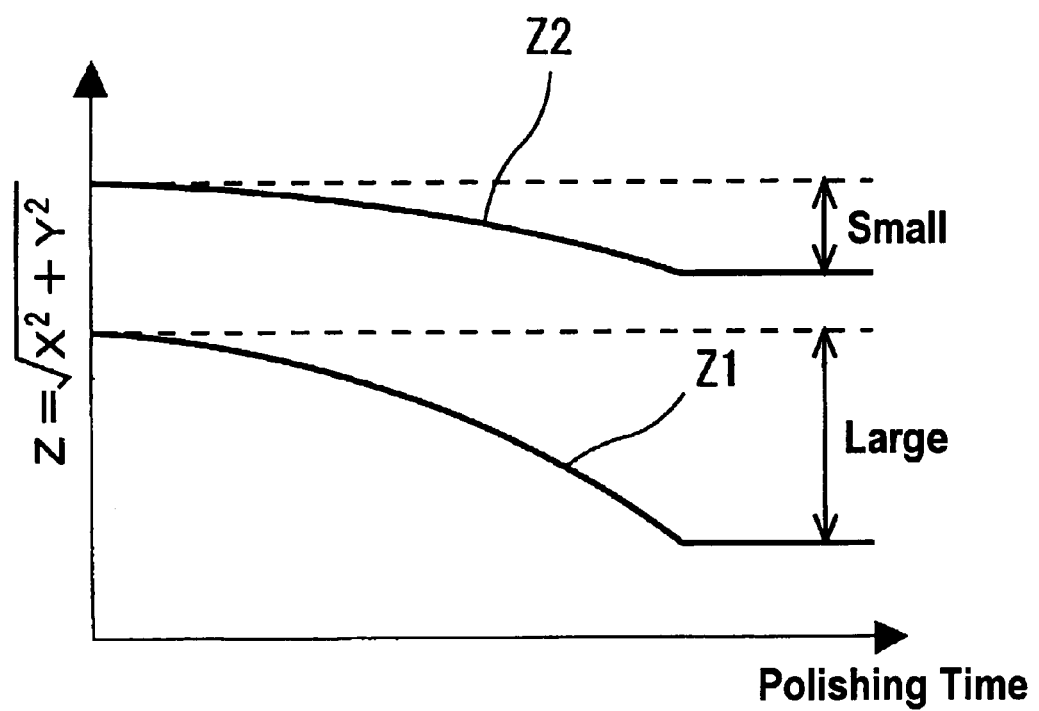
FIG. 8 is a diagram for illustrating a difference in degree of a decrease in the impedance Z between the normal substrate and the low-resistance substrate.
Figure 9:
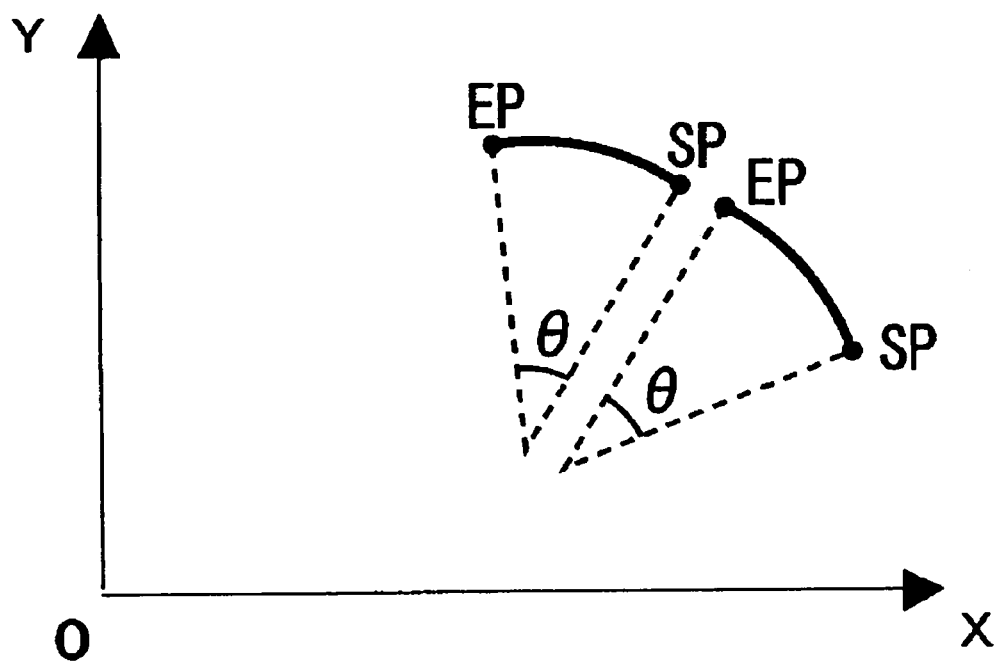
FIG. 9 is a diagram showing a change in output signal of the eddy current sensor due to the resistivity of the low-resistance substrate.
Figure 10:
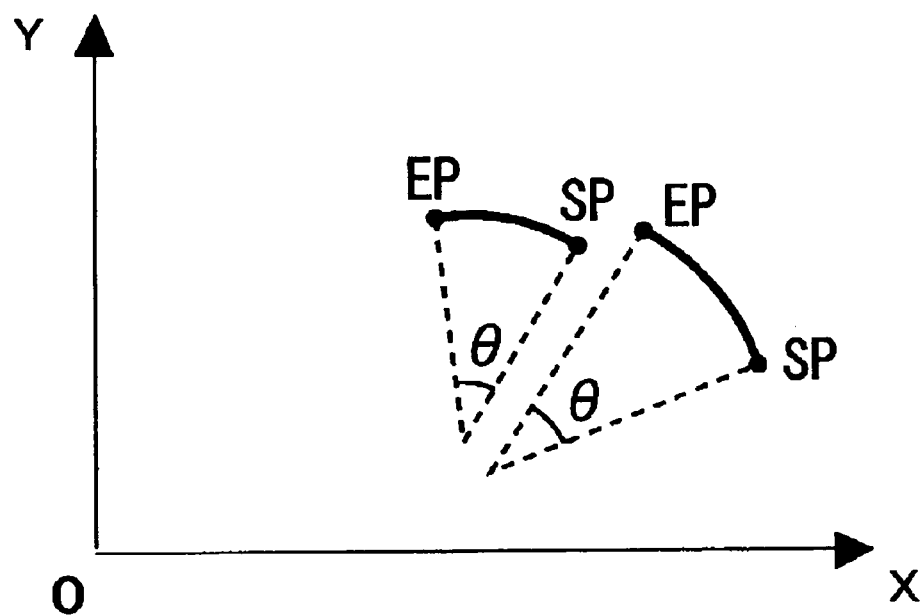
FIG. 10 is a diagram showing a change in output signal of the eddy current sensor due to the resistivity of the low-resistance substrate.
Figure 11:
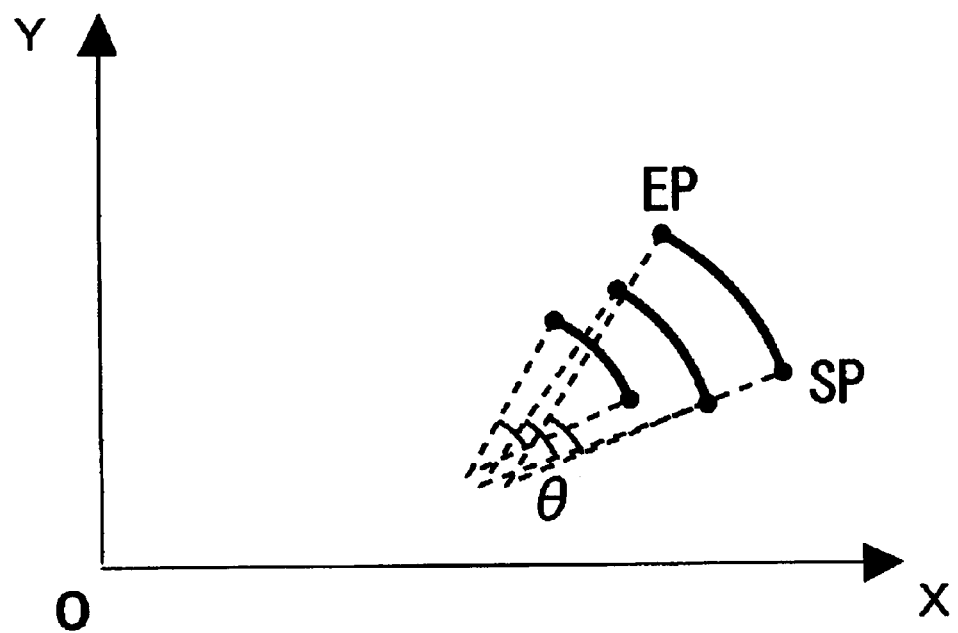
FIG. 11 is a diagram showing a change in output signal of the eddy current sensor due to a change in distance between the substrate and the eddy current sensor.
Figure 20:
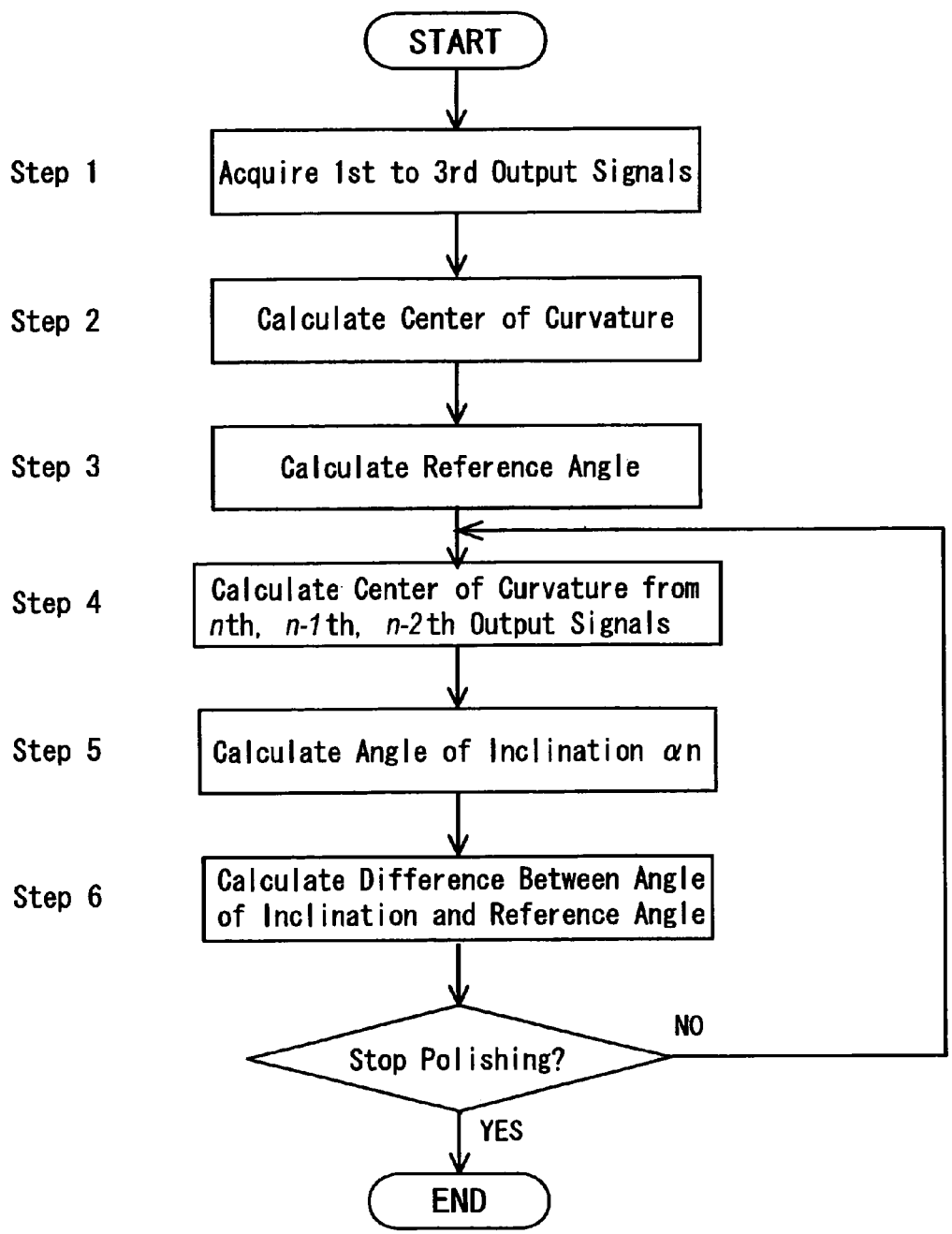
FIG. 20 is a diagram showing a flow chart of creating a monitoring signal.
Figure 21:
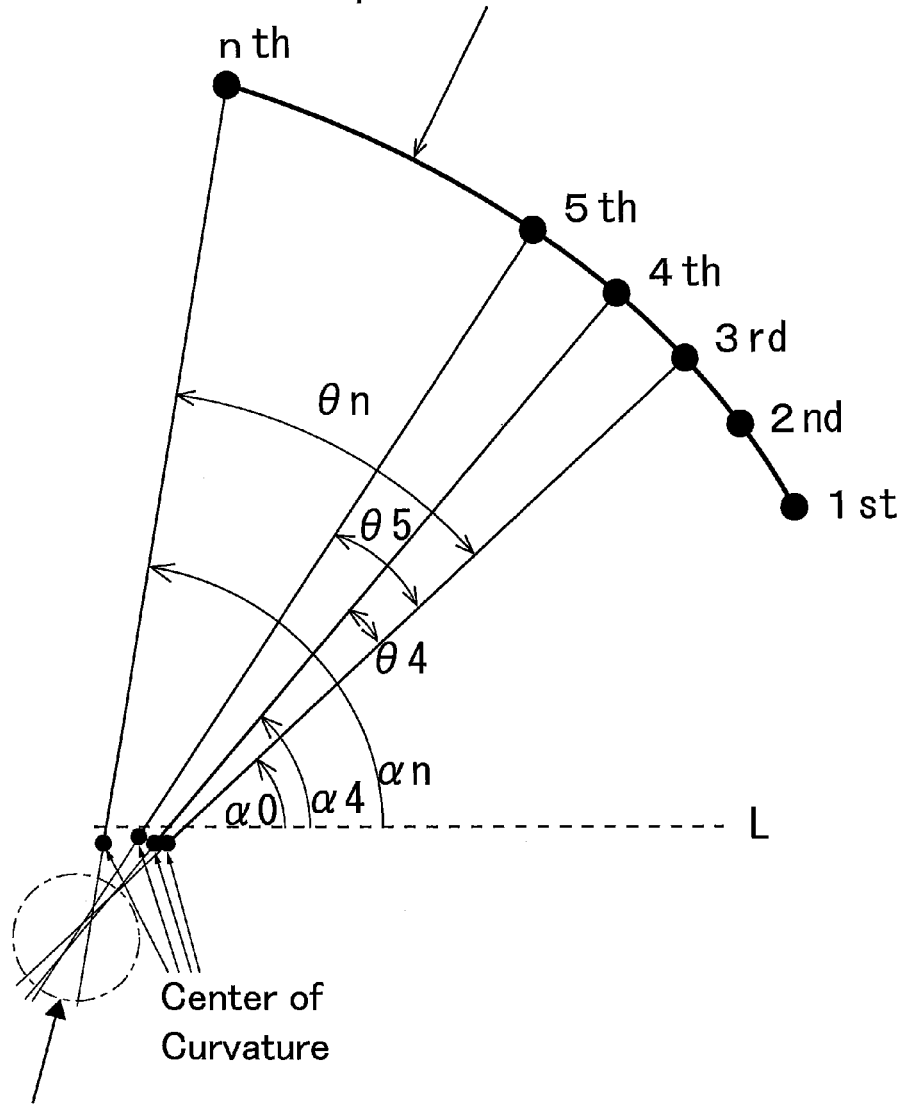
FIG. 21 is a diagram showing a relationship between an arc-shaped locus formed by output signals of the eddy current sensor plotted on a XY coordinate system and a central angle of the locus.

Next, a method of monitoring the change in film thickness based on the monitoring signal that is to change in accordance with the film thickness will be described. FIG. 20 is a diagram showing a flow chart of creating the monitoring signal, and FIG. 21 is a diagram showing a relationship between an arc-shaped locus formed by the output signals of the eddy current sensor plotted on the XY coordinate system and a central angle of the locus. The monitoring signal, which will be described below, is created from the signals obtained through the above-mentioned processes as shown in FIG. 3 (e.g., the rotating process, the translating process) performed on the output signals X and Y of the eddy current sensor 50. The monitoring signal may be created from raw signals that are not subjected to the above-mentioned processes. In this specification, the output signals of the eddy current sensor 50 include both signals obtained through the above-mentioned processes and the raw signals without application of the above-mentioned processes.

The output signals of the eddy current sensor 50 are acquired by the monitoring unit 53 each time the polishing table 12 makes one rotation. The output signals obtained comprise two signals corresponding to the resistance component X and the inductive reactance component Y of an electric circuit including the sensor coil 102 of the eddy current sensor 50 (the sensor-side circuit in FIG. 1). These output signals are successively plotted as coordinates on the XY coordinate system by the monitoring unit 53. Plotting of the coordinates does not necessarily mean actually making a graphical coordinate system, but includes defining the output signals X and Y as the coordinates on the XY coordinate system in accordance with a manner of plotting coordinates on a coordinate system. More specifically, the monitoring unit 53 defines the output signals X and Y as the coordinates on the XY coordinate system each time the monitoring unit 53 acquires the resistance component X and the inductive reactance component Y which are two output signals of the eddy current sensor 50

Since the polishing table 12 rotates at a constant speed during polishing, acquiring and plotting of the coordinates are performed at a constant time interval. The output signals of the eddy current sensor 50 with respect to the same radial position (area) of the substrate are acquired each time the polishing table 12 makes one rotation. In this case, when the polishing table 12 makes three rotations, three data points are acquired (step 1). When three data points are known, it is possible to determine an approximate center of curvature as a center of an arc passing through these three data points. Thus, as step 2, a center of curvature of an arc specified by a first data point, a second data point, and a third data point is determined. The third data point is the latest data point (i.e., the data point representing the output signals acquired when the polishing table 12 makes the third rotation). Then, an angle of inclination of a linear line connecting the third data point and the center of curvature is determined. This angle of inclination can be calculated as an angle between a reference line L and the linear line connecting the third data point and the center of curvature. This reference line L is a fixed line. A line parallel to the X axis may be used as the reference line L. The angle of inclination obtained is stored as a reference angle $\alpha 0$ in the monitoring unit 53 (step 3).

Each time the new output signals (i.e., the data point) are plotted, the center of curvature is determined from a locus formed by the latest three data points (nth, n−1th, and n−2th data points), as step 4. At step 5, an angle $\alpha n$ between the reference line L and the line connecting the center of curvature obtained and the latest data point (the nth data point) is determined. Then, an angle $\theta n$ is calculated by subtracting the angle $\alpha 0$ from the angle $\alpha n$ (step 6). This angle $\theta n$ indicates an increase in the angle of inclination of the linear line connecting the point specified by the data point and the center of curvature (i.e., an increase in central angle). In step 2 and step 4, in view of reducing adverse effects of variations in values of the output signals, it is possible to determine the arc from three data points selected from the latest four or more data points, or to determine a regression circle from the latest four or more data points to find the center of curvature of the regression circle.

Figure 22:
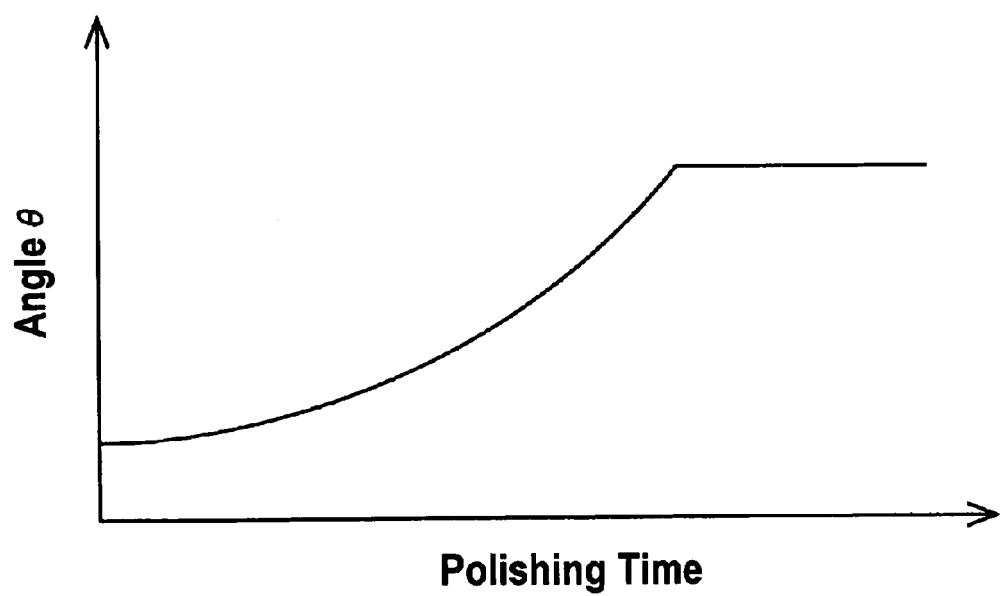
FIG. 22 is a diagram showing a graph obtained by plotting an angle θ on a vertical axis and by plotting a polishing time on a horizontal axis.

FIG. 22 is a diagram showing a graph obtained by plotting the angle $\theta$ on a vertical axis and by plotting a polishing time on a horizontal axis. As shown in FIG. 22, the angle $\theta$ (i.e., the above-described angle $\theta n$) increases with the lapse of the polishing time, and becomes constant at a certain time point. As described above, the central angle changes in accordance with a thickness of a conductive film as an object of polishing. Therefore, this angle $\theta$ serves as the monitoring signal that is to change in accordance with the film thickness. The change in film thickness can be monitored based on the change in the monitoring signal, i.e., the angle $\theta$. Becoming constant in the angle $\theta$ means that the conductive film is removed from a substrate by the polishing process. Therefore, a polishing end point can be detected by detecting a singular point where the increasing angle $\theta$ becomes constant. Further, if an initial film thickness is known, a current film thickness can be calculated from the change in the angle $\theta$. Therefore, polishing can be stopped when a desired film thickness is reached.

Figure 23:
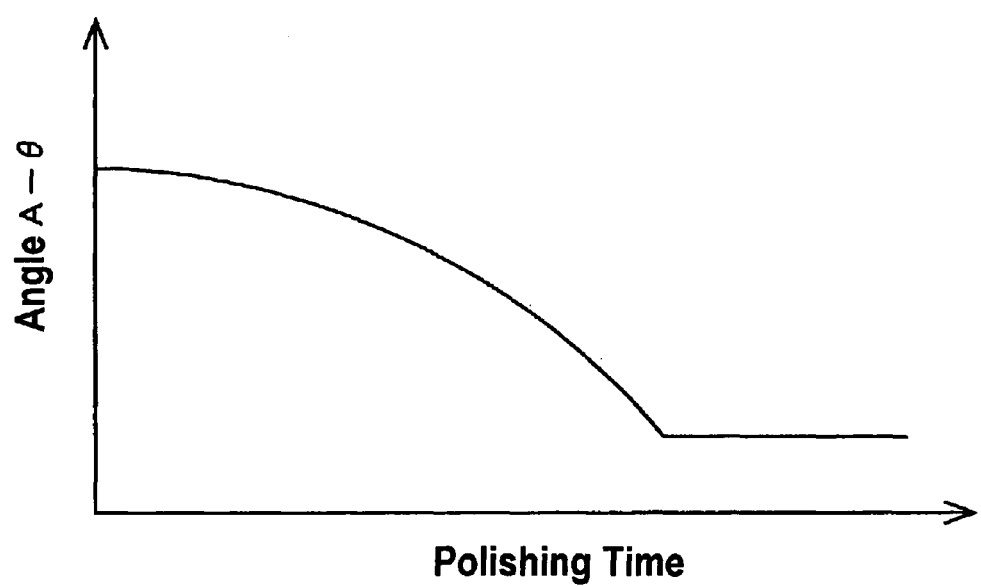
FIG. 23 is a diagram showing a graph obtained by plotting an angle A-θ on a vertical axis and by plotting the polishing time on a horizontal axis.

FIG. 23 is a diagram showing a graph obtained by plotting an angle A-$\theta$ (a symbol "A" represents a natural number, e.g., 100) on a vertical axis and by plotting the polishing time on a horizontal axis. This graph is substantially the same as the graph in FIG. 22, but is different in that an angle A-$\theta$ is used as the monitoring signal. As can be seen from FIG. 23, as the thickness of the conductive film decreases, the angle A-$\theta$ as the monitoring signal decreases as well. Therefore, the graph in FIG. 23 describes visually the decrease in film thickness with the lapse of the polishing time.

According to the present invention, even when low-resistance substrates are polished, monitoring of the conductive film is not affected by variation in low resistivity of the substrates. Further, monitoring is not affected by a change in distance between a substrate and the eddy current sensor 50 due to wear of the polishing pad 10. Therefore, highly accurate monitoring of the film thickness can be achieved, and as a result, a polishing end point and a changing point of the polishing conditions can be accurately detected from the remaining film thickness on the substrate.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

What is claimed is:

1. A monitoring method for monitoring a change in thickness of a conductive film brought into sliding contact with a polishing surface of a polishing pad using an eddy current sensor, the monitoring method comprising:
  acquiring an output signal of the eddy current sensor when the eddy current sensor is facing the conductive film, the output signal comprising two signals corresponding to a resistance component and an inductive reactance component of an impedance of an electric circuit including a coil of the eddy current sensor;
  defining the two signals as a data point on a coordinate system;
  repeating said acquiring of the output signal and said defining of the data point on the coordinate system until at least three data points are obtained;
  determining a center of curvature of an arc specified by the at least three data points;
  determining a reference angle of inclination of a line connecting the center of curvature and a newest data point of the at least three data points;
  after said determining of the reference angle of inclination, repeating said acquiring of the output signal and said defining of the data point on the coordinate system;
  determining a new center of curvature of an arc specified by a new set of at least three of the data points, including a newest data point, on the coordinate system each time a new data point is defined on the coordinate system;
  determining an angle of inclination of a line connecting the new center of curvature and the new data point of the new set of at least three data points;
  subtracting the reference angle of inclination from the angle of inclination to obtain an increase in the angle of inclination; and
  monitoring a change in thickness of the conductive film by monitoring a change in the increase in the angle of inclination.

2. The monitoring method according to claim 1, wherein the conductive film is formed on a low-resistance substrate.

3. The monitoring method according to claim 1, further comprising:
  creating, from the increase in the angle of inclination, a monitoring signal that is to decrease in accordance with the increase in the angle of inclination, wherein said monitoring of the change in thickness of the conductive film comprises monitoring a change in thickness of the conductive film based on a change in the monitoring signal.

4. The monitoring method of claim 1, wherein said acquiring of the output signal of the eddy current sensor, said defining of the two signals as the data point, said repeating of said acquiring of the output signal and said defining of the data point, said determining of the center of curvature, said determining of the angle of inclination, said subtracting of the reference angle of inclination from the angle of inclination, and said monitoring of the change in thickness of the conductive film occur during polishing of the conductive film.

* * * * *